(12) United States Patent
Hall et al.

(10) Patent No.: US 9,702,150 B2
(45) Date of Patent: Jul. 11, 2017

(54) GUTTER MOUNT

(71) Applicants: Keith Edward Hall, Lymm (GB); Barry Michael Hall, Lymm (GB)

(72) Inventors: Keith Edward Hall, Lymm (GB); Barry Michael Hall, Lymm (GB)

( * ) Notice: Subject to any disclaimer, the term of this patent is extended or adjusted under 35 U.S.C. 154(b) by 0 days.

(21) Appl. No.: 14/346,286

(22) PCT Filed: Sep. 21, 2012

(86) PCT No.: PCT/EP2012/068701
§ 371 (c)(1),
(2) Date: Mar. 20, 2014

(87) PCT Pub. No.: WO2013/041706
PCT Pub. Date: Mar. 28, 2013

(65) Prior Publication Data
US 2015/0028178 A1  Jan. 29, 2015

(30) Foreign Application Priority Data

Sep. 23, 2011 (GB) .................................. 1116469.6

(51) Int. Cl.
*E04D 13/072* (2006.01)
*E05B 65/00* (2006.01)
*F16M 13/02* (2006.01)

(52) U.S. Cl.
CPC .......... *E04D 13/0722* (2013.01); *E05B 65/00* (2013.01); *F16M 13/02* (2013.01)

(58) Field of Classification Search
USPC .............................. 248/48.1, 48.2; 52/11, 12
See application file for complete search history.

(56) References Cited

U.S. PATENT DOCUMENTS

| | | | | |
|---|---|---|---|---|
| 3,630,473 A | * | 12/1971 | Landis ................... | E04D 13/076 248/222.51 |
| 4,305,236 A | * | 12/1981 | Williams ............ | E04D 13/0685 248/48.1 |
| 5,893,239 A | * | 4/1999 | Leahy ................... | E04D 13/076 248/48.2 |
| 5,896,706 A | * | 4/1999 | Pike ...................... | E04D 13/076 52/11 |
| 2002/0125377 A1 | * | 9/2002 | Miller .................. | E04D 13/0722 248/48.2 |
| 2009/0255190 A1 | * | 10/2009 | Kennedy ............. | E04D 13/0725 52/11 |
| 2014/0196400 A1 | * | 7/2014 | Bell ..................... | E04D 13/0725 52/705 |

* cited by examiner

*Primary Examiner* — Steven Marsh
(74) *Attorney, Agent, or Firm* — Sunstone IP (57) ABSTRACT

The present invention relates to a gutter mount which is particularly for use on outbuildings and temporary structures, such as sheds. The gutter mount comprises an adjustable retaining member for receiving the guttering, allowing the guttering to be retained in the correct position independent of roof angle, and a means of fastening the gutter mount to a structure. Additionally the gutter mount incorporates a design which can be affixed to a structure by hand, obviating the needs for tools and facilitating repositioning of the guttering during installation.

18 Claims, 6 Drawing Sheets

GUTTER MOUNT

The present invention relates generally to a gutter mount for use in mounting and supporting guttering and more specifically relates to a gutter mount for use with guttering associated with outbuildings and temporary buildings, such as sheds.

Gutters are used in relation to most buildings to effectively channel water from the roof of the building away from the foundations, so as to minimise the destructive effects of water on the buildings. However, in general, temporary buildings such as sheds are not supplied with any form of gutter system and therefore water is allowed to run off and potentially collect around the base of the shed.

The gutters are secured in place using a gutter mount so as to secure the guttering to an adjacent surface, such as for example a fascia board. Typically, the gutter mounts are located at intervals along the length of guttering, so as to provide effective support to the guttering whilst in situ.

Existing gutter mounts are generally designed to be affixed to a vertically orientated surface, such as a fascia board, such that the attached guttering lies substantially horizontal so as to collect storm water from an adjacent surface, such as a roof. The storm water then runs along the length of guttering and is typically transferred to a substantially vertically arranged downspout and is then released out of the gutter system, either into a drainage system or into a water butt or similar water storage device, to prevent water accumulation around the foundations or base of the building or structure, which may cause damage.

Typically, the gutter mounts require installation tools and potentially more than one person to install the gutter mounts and guttering. Furthermore, once the guttering has been fixed into place, it is not usually re-positionable without removing most or all of the fixings, which may be time consuming and inconvenient.

The present Applicants have identified that whilst the above arrangement is generally acceptable, there may be advantages in providing an alternative gutter mount for use with guttering that is not only easier to install, but also that allows for a greater range of site installations. The present Applicants have identified a particular potential advantage in such an alternative gutter mount in the case of installations associated with temporary buildings. Such buildings may benefit from a gutter system installation, however the cost and installation procedure associated with fitting a more traditional gutter system and fixing arrangement may be unjustifiable for a temporary building.

Accordingly, it is an object of the present invention to provide an improved gutter mount for use with guttering that enables a guttering system to be used in a wide range of site installations, including but not limited to surfaces disposed at an angular relationship to the vertical.

It is a further object of the present invention to provide an improved gutter mount for use with guttering that is not only easy to install but also allows for re-positioning of the guttering during installation.

Thus and in accordance with a first embodiment of the present invention there is provided a gutter mount comprising at least one fastening means for attaching said gutter mount to a surface and a form fitting member having at least one retaining member to receive and allow adjustment of a gutter to maintain said gutter in an operable alignment.

Thus and in accordance with a second embodiment of the present invention there is provided a gutter mount comprising at least one fastening means for attaching said gutter mount to a surface and a substantially C-shaped member having at least one concentrically arranged retaining member to receive and allow adjustment of a gutter to maintain said gutter in an operable alignment.

By form fitting it is meant any shape or configuration of member that is designed to fit closely around a particular shape of gutter.

The gutter mount may comprise a form fitting member for use with supporting a length of gutter. Said form fitting member may be substantially C-shaped which is most preferably suitable for use with a substantially C-shaped gutter, so as the gutter mount and gutter are complementary shapes and thus the gutter mount may adequately support the gutter.

It is further to be appreciated that the gutter mount may comprise an alternatively shaped supporting member, for example to enable the gutter mount to engage with different shapes of gutter, so long as the gutter mount is able to fulfil its function of adequately supporting and securing a length of guttering relative to a surface.

The gutter mount may further comprise at least one strengthening component, including but not limited to a rib or extruded section.

The gutter mount may comprise plastics or any other suitable material.

The gutter mount is most preferably easy to install and further, capable of being repositioned quickly and easily if necessary. The gutter mount may further comprise at least one security device, which may include but not be limited to a tamper-proof fastener, so as to prevent undesired removal of the gutter mount once secured into position.

Preferably the gutter mount is capable of being vertically adjusted such that the height of the gutter, relative to the surface to which it is attached, can be altered in order to provide an appropriate fall for the water.

Preferably, the gutter mount is adaptable to suit a variety of installations and in particular, may be capable of being mounted to surfaces that are disposed at a range of angles relative to the vertical, whilst still ensuring that the gutter being supported is maintained in a substantially horizontal configuration and therefore in an operable alignment for the collection and transfer of storm water.

The gutter mount may further still comprise at least one fastening means for attaching the gutter mount to a surface, such as for example a shed roof.

The fastening means may comprise metals, plastics or any other suitable materials or combination of materials thereof.

The fastening means may comprise a fastener capable of being tightened and un-tightened by hand, most preferably without the need for installation tools, such as for example a screwdriver, and may further comprise at least one additional grip component, such as for example a spike or plurality of spikes capable of engaging with a surface. The additional grip components may function independently or be dependent on the extent to which the fastener has been tightened.

The fastening means is preferably capable of engaging with at least a portion of a building or other structure, so as to secure the gutter mount to the building or other structure.

The fastening means may further comprise a ball joint or other such pivotable arrangement so as to provide further scope for adjustment of the fastening means during use.

The fastening means may comprise a push-fit lock and release mechanism to enable said fastener to be quickly and easily engaged with the gutter mount and surface and also to allow quick and easy release of the fastener in the event that the gutter mount requires repositioning.

The gutter mount preferably further comprises at least one retaining member which is capable of receiving and retaining a gutter between said retaining member and the support member that comprises the gutter mount.

The retaining members may be concentrically arranged relative to the support member, such as in the case of a supporting member comprising a substantially C-shaped configuration. This arrangement is most preferably for use with a substantially C-shaped gutter such that said gutter may be held between the supporting member and retaining members whilst allowing for rotational and translational movement of the gutter to maintain said gutter in an operable alignment.

The retaining members may be alternatively arranged and may or may not further, comprise a hinge, sliding-type arrangement or another form of fastening means to allow a gutter to be supported and retained between the supporting member and retaining members of the gutter mount, whilst still allowing for movement of the gutter to maintain said gutter in an operable alignment once the gutter mount is secured to a surface.

The invention will now be described further by way of example only and with reference to the drawings in which.

Figure 1:
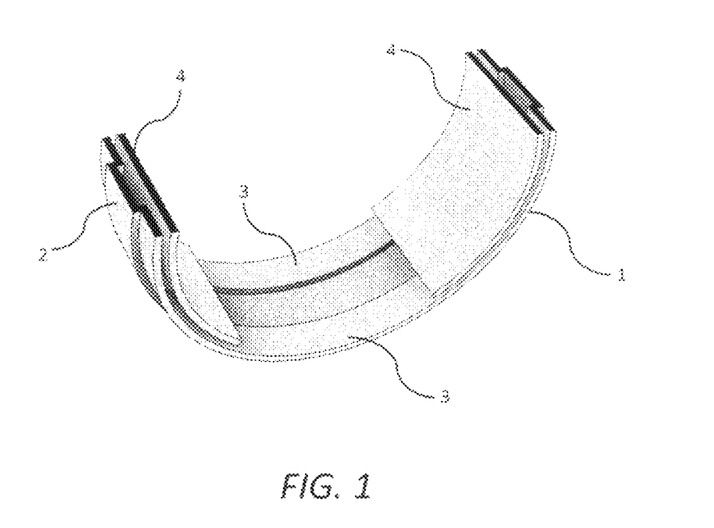
FIG. 1 shows a perspective view of one embodiment of the gutter mount illustrating a portion of the C-shaped supporting member that comprises the gutter mount.

Referring now to FIG. 1 there is shown a perspective view of one embodiment of the gutter mount illustrating a C-shaped supporting member 1 that comprises the gutter mount 13 in the present embodiment.

The C-shaped supporting member 1 comprises a substantially C-shaped configuration and further, comprises plastics and is shaped so as to provide a central portion 2 that is proud of the adjacent side portions 3 of the supporting member 1 on the exterior surface. The configuration of the central portion 2 consequently forms a channel on the interior surface of the supporting member 1 and affords additional structural strength and rigidity to the supporting member 1.

Figure 2:
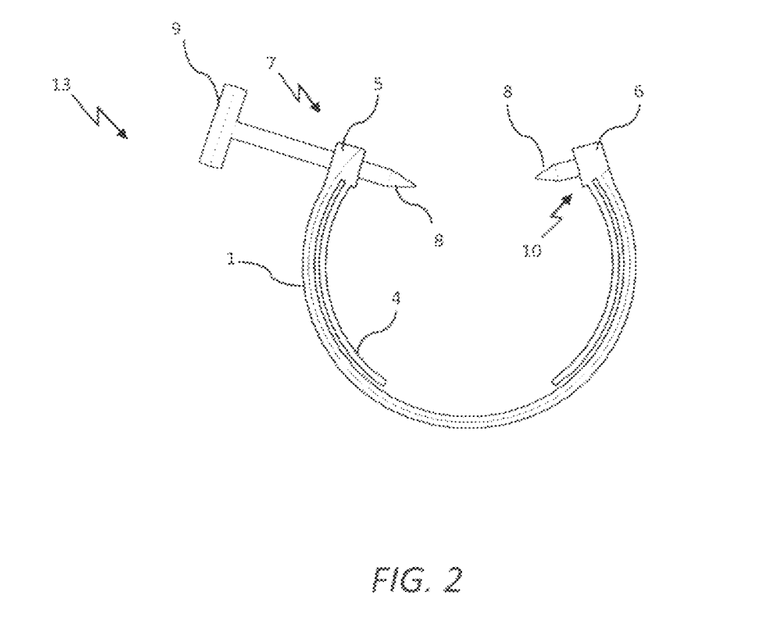
FIG. 2 shows a end-on view of one embodiment of the gutter mount comprising a C-shaped supporting member and fastening means respectively.

Referring now to FIGS. 1 and 2, the C-shaped supporting member 1 further comprises two gutter retainers 4 that are concentrically arranged relative to the supporting member 1 and are integrally connected to the supporting member 1 at the fastening points 5 and 6 respectively. The gutter retainers 4 extend from the fastening points 5 and 6 substantially three quarters of the length of the central 2 and side 3 portions.

The concentric arrangement of the supporting member 1 and the gutter retainers 4 allows for a length of gutter to engage with the gutter mount 13 and be held securely during use, as described in further detail with reference to FIG. 4.

The gutter mount 13 further comprises an adjustable fastener 7 that is engageable with the fixing point 5 of the supporting member 1. It will be appreciated that the adjustable fastener 7 may or may not be capable of completely disengaging with the supporting member 1.

The adjustable fastener 7 comprises at one end a tapered point 8, for engaging with a surface to which the gutter mount 13 is to be secured. The adjustable fastener 7 further comprises a screw thread (not illustrated) on the shaft of the fastener 7, which, in conjunction with the tapered point 8, assists in driving the fastener 7 into a surface, so as to secure the gutter mount 13 relative to the surface.

The fastener 7 further comprises a head 9 at one end, the head 9 being of a suitable size to enable a user to manually rotate the fastener 7 by gripping the head and turning it in a clockwise or anti-clockwise manner, so as to tighten or un-tighten respectively, the fastener 7 and thus gutter mount 13 in relation to the surface to which it is being attached. This enables the gutter mount 13 to be installed without the requirement for particular tools, such as a screwdriver.

The gutter mount 13 further comprises two additional fasteners 10, which are described in further detail with reference to FIG. 3.

Figure 3:
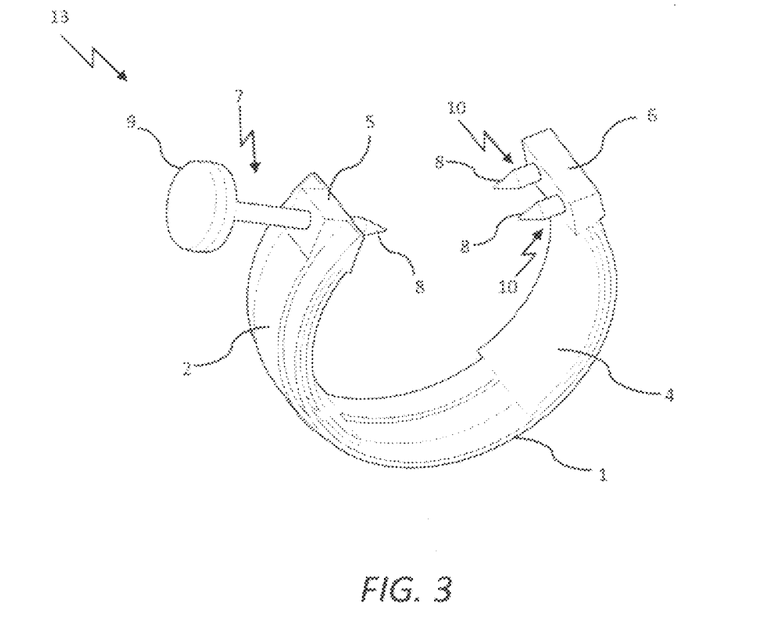
FIG. 3 shows a perspective view of one embodiment of the gutter mount shown in FIG. 2, illustrating the C-shaped supporting member and fastening means respectively.

Referring now to FIG. 3, the gutter mount 13 further comprises two additional fasteners 10, the additional fasteners 10 being connected at one end to a fastening point 6 and located towards the top of the supporting member 1 and having a tapered point 8 at the other end for engaging with a surface to which the gutter mount 13 is to be secured.

It is of course to be appreciated that the fastening means illustrated in the present embodiment are by way of example only and alternative embodiments of the gutter mount 13 may comprise alternative fastening means, without departing from the scope of invention as described herein.

Figure 4:
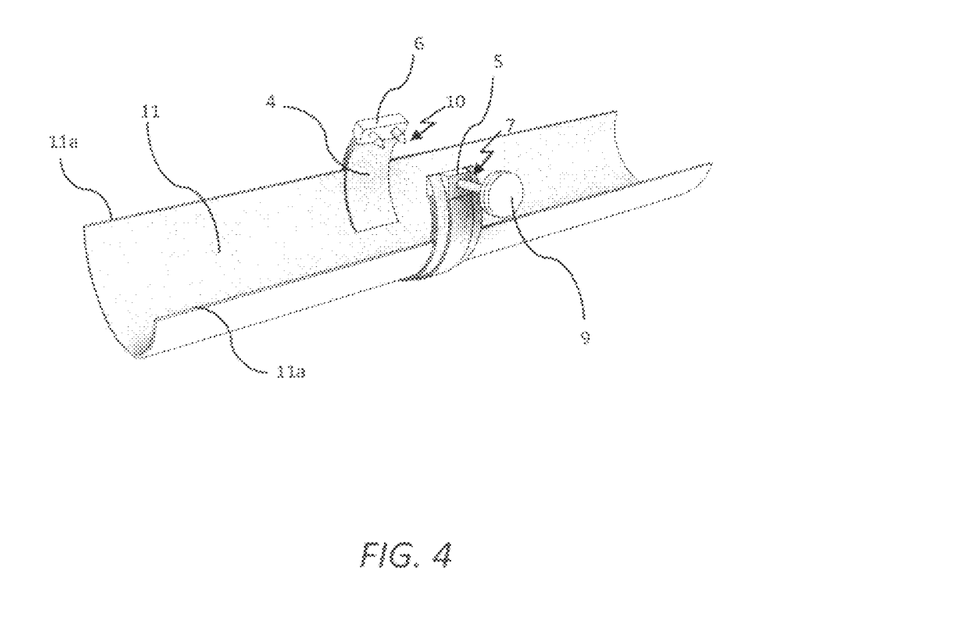
FIG. 4 shows a perspective view of one embodiment of the gutter mount engaged with a length of gutter.

Referring now to FIG. 4 there is shown a perspective view of one embodiment of the gutter mount 13 engaged with a length of gutter 11. The gutter 11 is retained within the gutter mount 13 between the interior surface of the gutter 11 and the underside of the gutter retainers 4, whilst still allowing some movement of the gutter 11 within the confines of the gutter mount 13, to provide for adjustment of the position of the gutter 11 relative to the gutter mount 13 during installation of a gutter system.

Said movement may include axial rotation of the gutter 11 between the supporting member 1 and gutter retainers 4 in order to maintain a substantially horizontal alignment of the edges 11a of the gutter 11 that run the length of the gutter 11. The axial rotation allows the length of gutter 11 to remain substantially horizontal and therefore in an optimal configuration for receiving storm water from an adjacent surface, in particular when the gutter mount is attached to such surfaces disposed at a range of angles relative to the vertical, such as a roof. It will be appreciated that this feature of the gutter mount 13 allows installation of a gutter system to a variety of surfaces and does not limit the installation of the gutter mount 13 to a substantially vertical surface.

It will further be appreciated that the axial rotation of a length of gutter 11 also enables a downspout (not shown) connected to the gutter 11 to be orientated in a substantially vertical arrangement as would be desired, again, in particular when the gutter mount is attached to surfaces disposed at a range of angles relative to the vertical.

The movement may further include linear translation of the gutter 11 between the supporting member 1 and gutter retainers 4, so as to allow a length of guttering 11 to be slid into an appropriate position relative to the gutter mount 13, including when the gutter mount 13 has already been secured to a surface.

Furthermore, the movement may include vertical translation of the gutter 11 so as to allow the height of the gutter 11, in relation to the surface to which it is attached, to be adjusted to provide a suitable fall for the water.

This movement capability increases ease of installation of a gutter system by allowing a user to secure the gutter mount 13 to a surface and then subsequently slide a length of guttering 11 between the supporting member 1 and gutter retainers 4 of the gutter mount 13 into an appropriate position.

It will be appreciated that alternative embodiments of the present invention that employ other configurations of form fitting gutter support member may permit different methods of gutter adjustment and retention, in particular where axial rotation is not feasible due to the shape and configuration of the gutter mount and gutter arrangement.

Figure 5:
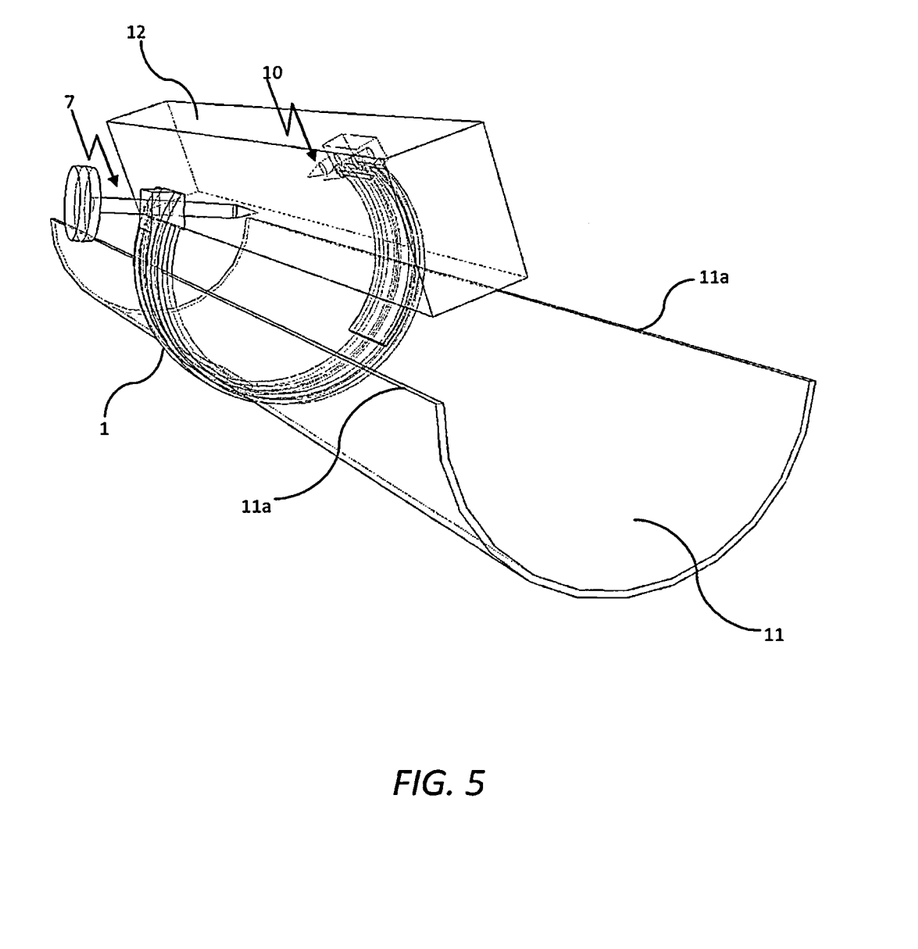
FIG. 5 shows a perspective view of one embodiment of the gutter mount engaged with a length of gutter and as fitted to a surface during use, illustrating the mode of installation of the invention.

Referring now to FIG. 5 there is shown a perspective view of one embodiment of the gutter mount 13 engaged with a length of gutter 11 and as fitted to a surface 12 during use, illustrating the mode of installation of the invention.

As illustrated, the fastening means 7 and 10 respectively, engage either side of a surface 12 so as to effectively clamp the surface 12 and therefore secure the gutter mount 13 to the surface 12. It will be appreciated with reference to this Figure, that the ability to rotate the gutter 11 about a central axis of rotation within the confines of the gutter mount 13 means that the gutter edges 11a may be aligned in a substantially horizontal plane, in particular when the gutter mount is attached to surfaces 12 disposed at a range of angles relative to the vertical, as previously discussed.

It will further be appreciated that the range of movement of the gutter 11 permitted by the gutter mount 13 not only increases ease of installation, but also enables easy repositioning of the gutter system, including by unscrewing the fastener 7 to release the gutter mount 13 from an original position to a subsequent position, relative to the surface 12, without the requirement of separate installation tools.

Figure 6:
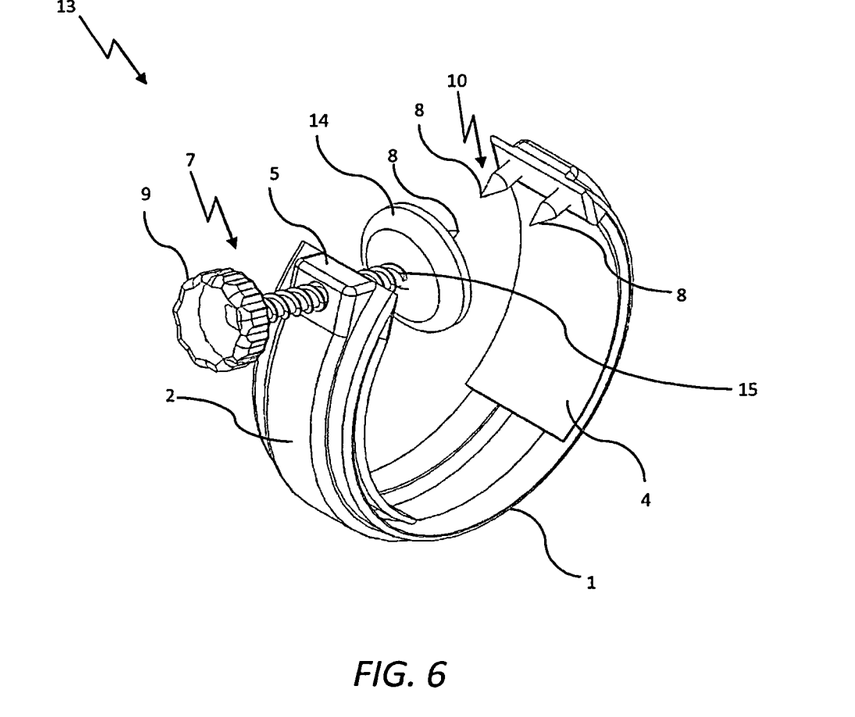
FIG. 6 shows a perspective view of one embodiment of the gutter mount comprising a fastener having a ball joint that provides additional flexibility for securing the gutter mount to a surface.
Figure 7:
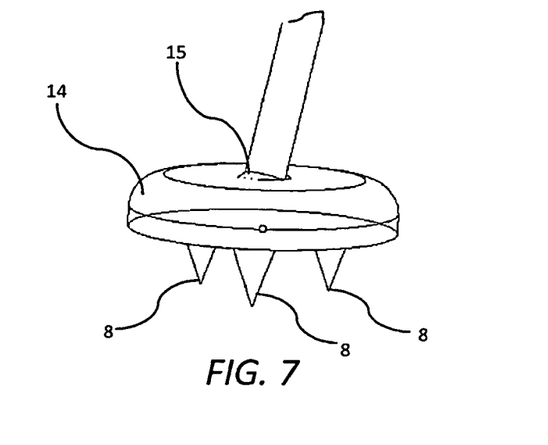
FIG. 7 shows an enlarged view of the fastener that comprises a ball joint as illustrated in FIG. 6.

Referring now to FIGS. 6 and 7, there is shown a perspective view of an embodiment of the present invention comprising a fastener 7 having a screw thread disposed on the surface of the shaft and a pivotable fastening plate 14.

As illustrated in FIG. 7, the pivotable fastening plate 14 comprises a ball joint 15 that is connected to the distal end of the fastener 7. Said ball joint 15 allows the shaft of the fastener 7 to pivot relative to the fastening plate 14.

The fastening plate 14 further comprises three fastening points 8 that are engageable with a surface 12. The gutter mount 13 can therefore be mounted in relation to a surface 12, such as that illustrated in FIG. 5, however the angle of the fastener 7 may be adjusted so that it is not necessarily restricted to being aligned substantially perpendicular relative to the fastening plate 14.

It is of course to be appreciated that the fastening plate 14 may comprise an alternative number of fastening points 8 and/or an alternative gripping surface designed to securely hold the fastening plate 14 in the desired position relative to a surface 12 without departing from the scope of invention as described herein.

Figure 8:
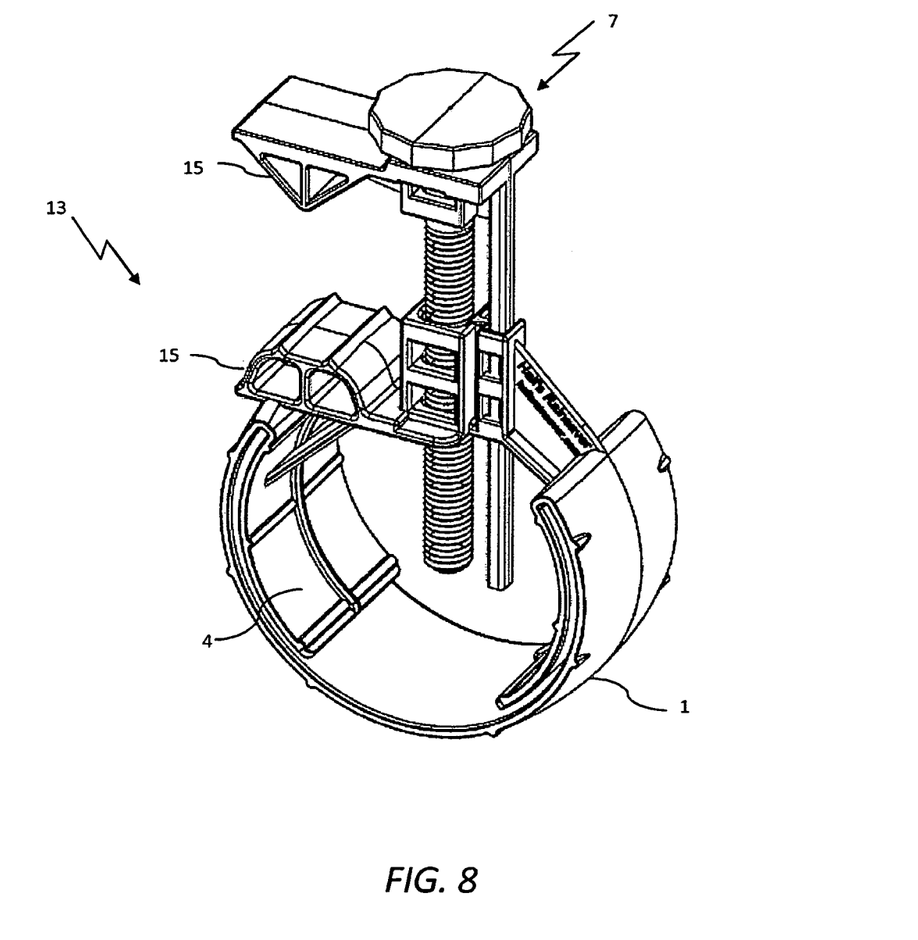
FIG. 8 shows a perspective view of an embodiment of the gutter mount comprising a screw which may operate the fastening means.

Referring now to FIG. 8 there is shown a further embodiment of the gutter mount 13 wherein the adjustable fastener 7 comprises a screw which operates the fastening means 15 such that the fastening means 15 may engage with a surface such as a roof edge.

The embodiments of fastening arrangement in FIGS. 6-8 may enable the gutter mount 13 to be fixed to a greater range of surfaces 12 and also will provide additional rigidity to the fastening arrangement. Furthermore, by utilising a plurality of fastening spikes 8, the surface area over which pressure is applied by the fastener 7 when it is tightened is increased, thus increasing security of the fastening arrangement.

Figure 9:
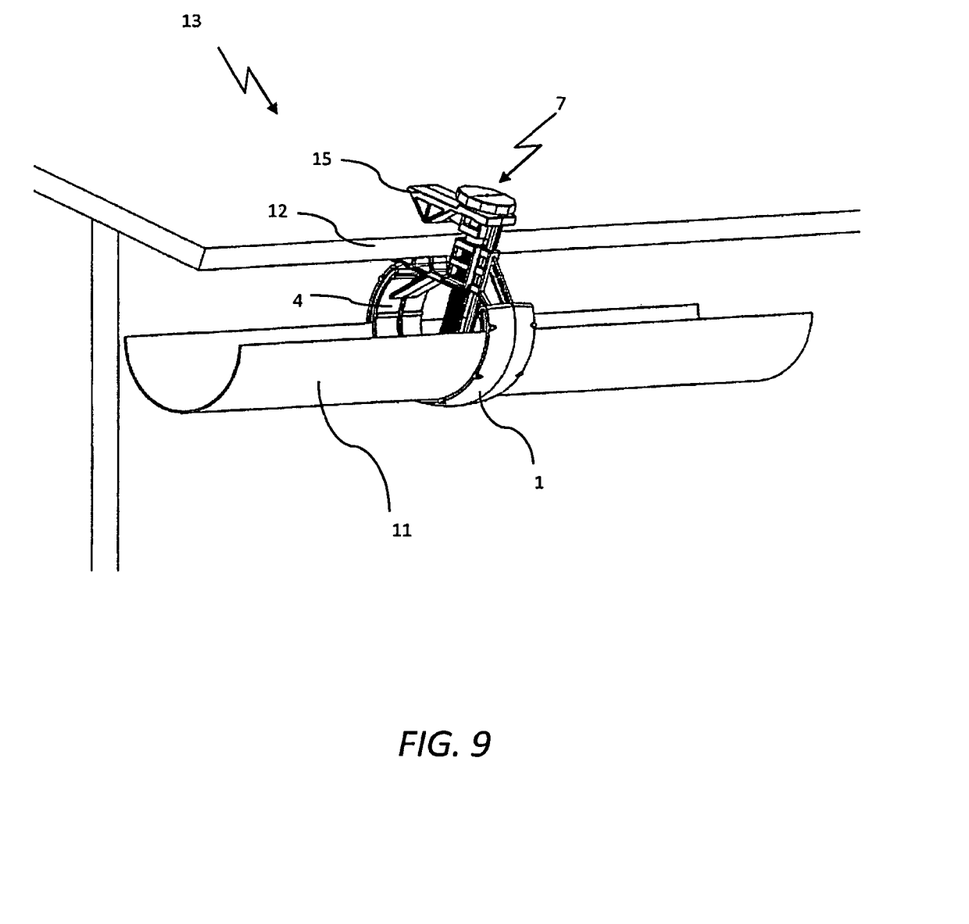
FIG. 9 shows a perspective view of one embodiment of the gutter mound engaged with a length of gutter and engaging with a surface as during use.

Referring now to FIG. 9, there is shown an embodiment of the gutter mount 13 engaged with a length of gutter 11 and a surface 12 as during use. The fastening means 15 engage with the surface 12 through the adjustable fastener 7 in order to close the fastening means 15 on the surface 12. The gutter 11 may be inserted between the supporting member 1 and gutter retainers 4 of the gutter mount 13 into an appropriate position.

It is of course to be appreciated that the invention is not to be restricted to the details of the embodiments described above which are described by way of example only.

The invention claimed is:

1. A gutter mount comprising:
   at least one manually adjustable fastening means for releasably coupling the gutter mount to a roof surface,
   a form fitting member, the form fitting member comprising a substantially C-shaped supporting member and a gutter retaining member;
   axial adjustment means for adjustment of a gutter, when mounted, such that the gutter can be maintained in a position in a particular orientation and to allow relative movement between the gutter and the roof to which the gutter mount is attached,
   wherein the axial adjustment means are formed by the gutter retaining member and the C-shaped supporting member, wherein the axial adjustment means is capable of receiving and retaining the gutter between the gutter retaining member and the C-shaped supporting member such that the gutter can be rotated within the C-shaped supporting member and the at least one gutter retaining member contacts an interior surface of the gutter to hold the gutter in place.

2. The gutter mount of claim 1, wherein the axial adjustment means comprises a pivotal arrangement, wherein the gutter pivots within the axial adjustment means.

3. The gutter mount in accordance with claim 1, wherein the fastening means comprises a push-fit lock and release mechanism.

4. The gutter mount of claim 1, further comprising additional gripping means operable to engage with the roof surface.

5. The gutter mount of claim 1, wherein the vertical height of the gutter can be adjusted to provide a fall for the water.

6. The gutter mount of claim 1, further comprising at least one security device to prevent unwanted removal of the gutter mount after installation.

7. The gutter mount according to claim 6 wherein the at least one security device is provided as a tamper-proof fastener.

8. The gutter mount of claim 1, wherein the C-shaped supporting member and retainers form a retaining channel that has a greater length than the distance between the two edges of a gutter along its convex surface.

9. The gutter mount of claim 1, wherein the C-shaped supporting member comprises at least one concentrically arranged gutter retainer extending from one end of the C-shaped supporting member along the concave surface thereof and overlaying that concave surface of the C-shaped supporting member.

10. The gutter mount according to claim 9, wherein two gutter retainers are provided, each extending from a respective end of the C-shaped supporting member.

11. The gutter mount of claim 1, wherein the gutter retaining member extends from one end of the C-shaped supporting member and is concentrically arranged along an interior concave surface thereof.

12. The gutter mount of claim 11, wherein the gutter retaining member is integrally formed with the C-shaped supporting member at the one end.

13. The gutter mount of claim 1, wherein the form fitting member comprises two gutter retaining members, each extending from a respective end of the C-shaped supporting member and concentrically arranged along an interior concave surface thereof.

14. The gutter mount of claim 13, wherein the gutter retaining members extend toward one another without contacting one another.

15. The gutter mount of claim 13, wherein the gutter retaining members are integrally formed with the C-shaped supporting member at the respective ends and form a retaining channel with the C-shaped supporting member.

16. The gutter mount of claim 1, wherein the gutter is axially adjustable with respect to the form fitting member.

17. The gutter mount of claim 1, wherein the gutter is circumferentially adjustable with respect to the form fitting member.

18. The gutter mount of claim 1, wherein the at least one manually adjustable fastening means releasably couples the gutter mount to the roof surface with the roof surface positioned between the fastening means.

* * * * *